United States Patent [19]

Pfahl, Jr.

[11] 4,194,297

[45] Mar. 25, 1980

[54] METHOD AND APPARATUS FOR GENERATING A CONTROLLABLY EXPOSED VAPOR BODY FOR HEATING ARTICLES

[75] Inventor: Robert C. Pfahl, Jr., Hanover Township, Northampton County, Pa.

[73] Assignee: Western Electric Company, Incorporated, New York, N.Y.

[21] Appl. No.: 864,305

[22] Filed: Dec. 27, 1977

[51] Int. Cl.² .......................... F26B 7/00; F27B 5/04
[52] U.S. Cl. ......................................... 34/26; 34/32; 34/34; 34/75; 165/105; 432/66; 432/197
[58] Field of Search ................. 34/13, 26, 32, 34, 75; 165/104 R, 105; 432/66, 197; 134/12, 168

[56] References Cited

U.S. PATENT DOCUMENTS

| | | | |
|---|---|---|---|
| 2,176,348 | 10/1939 | Juettner | 260/515 |
| 3,479,252 | 11/1969 | Holm et al. | 202/170 |
| 3,732,063 | 5/1973 | Corsaro et al. | 432/197 |
| 3,866,307 | 2/1975 | Pfahl et al. | 29/498 |
| 3,904,102 | 9/1975 | Chu et al. | 228/180 |
| 4,022,371 | 5/1977 | Skarvinko | 228/223 |
| 4,055,217 | 10/1977 | Chu et al. | 165/105 X |
| 4,090,843 | 5/1978 | Chu et al. | 432/197 |

OTHER PUBLICATIONS

Dingman, "Solvent Vapor Solder Reflow" IBM Technical Disclosure Bulletin, vol. 13, No. 3, p. 639, Aug. 1970.

*Primary Examiner*—John J. Camby
*Attorney, Agent, or Firm*—K. R. Bergum; R. P. Miller

[57] ABSTRACT

This disclosure is directed to the vapor condensation heating of articles to an elevated temperature so as to perform, for example, a soldering, brazing or fusing operation thereon, without requiring the immersion of the articles within the heat transfer liquid-generated body of hot saturated vapor. This is accomplished in accordance with several methods and apparatus which allow the saturated body of vapor to controllably rise to and heat only a selected underside surface area (or areas) of each article, in succession, while minimizing the loss of any vapor to the atmosphere at all times.

24 Claims, 9 Drawing Figures

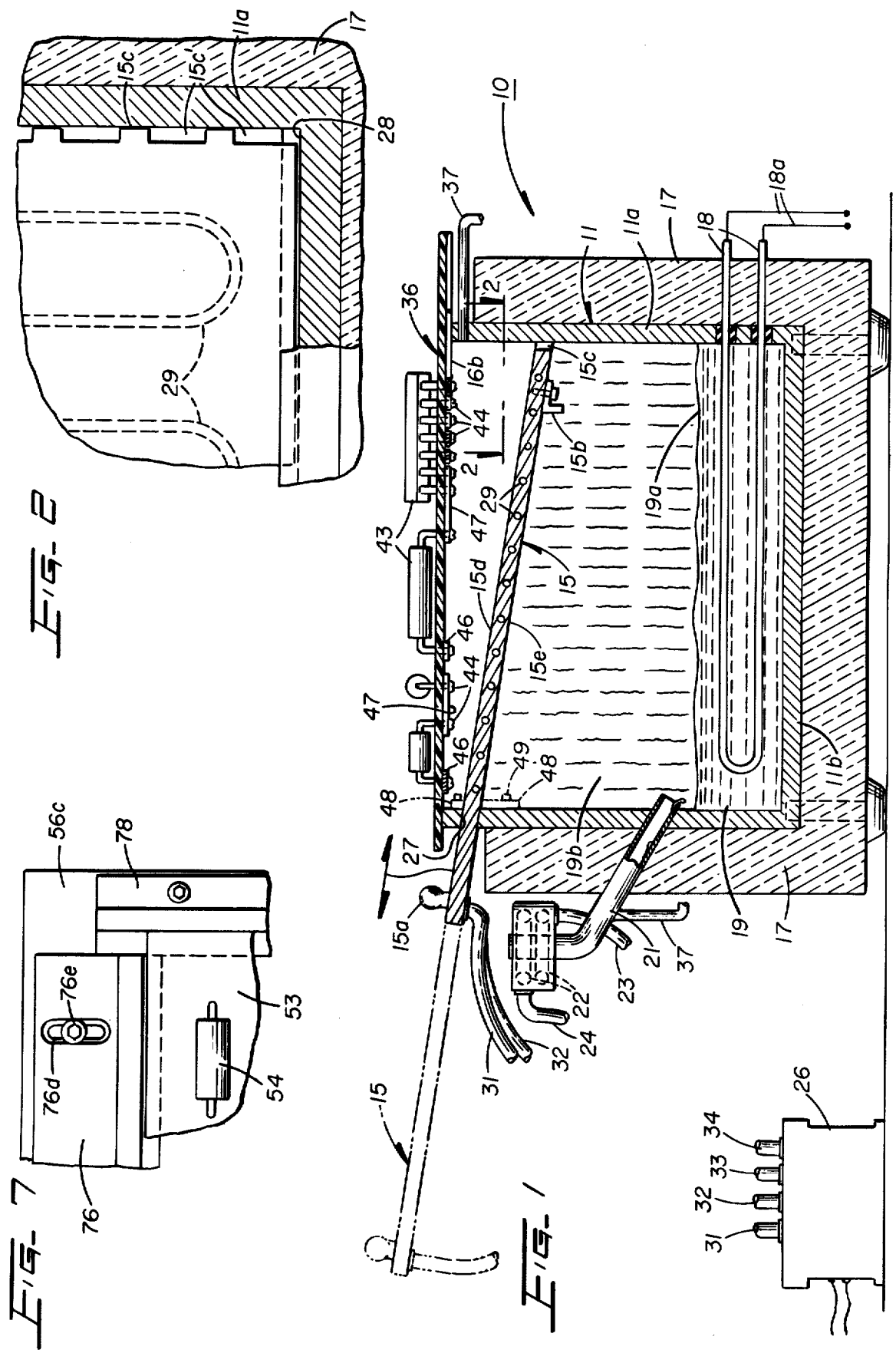

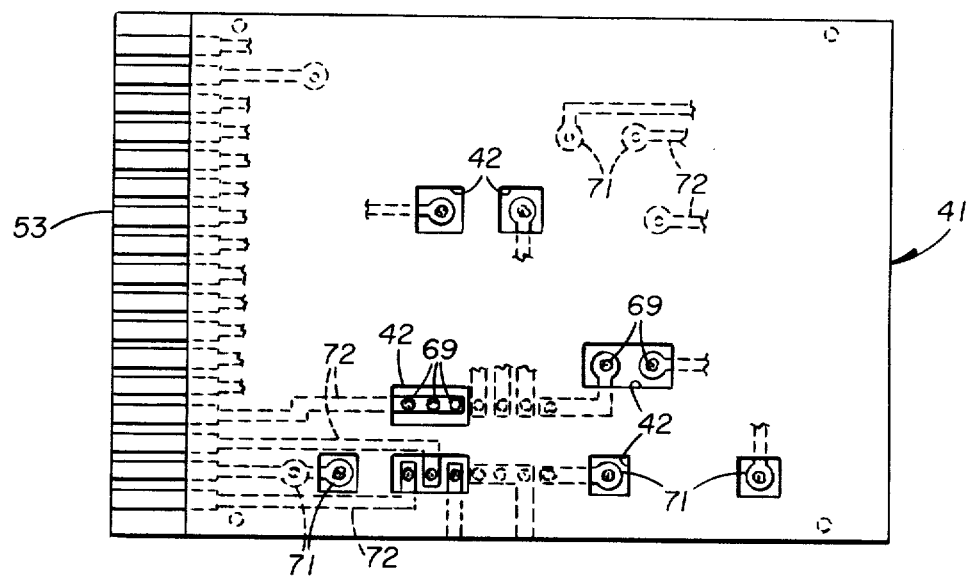
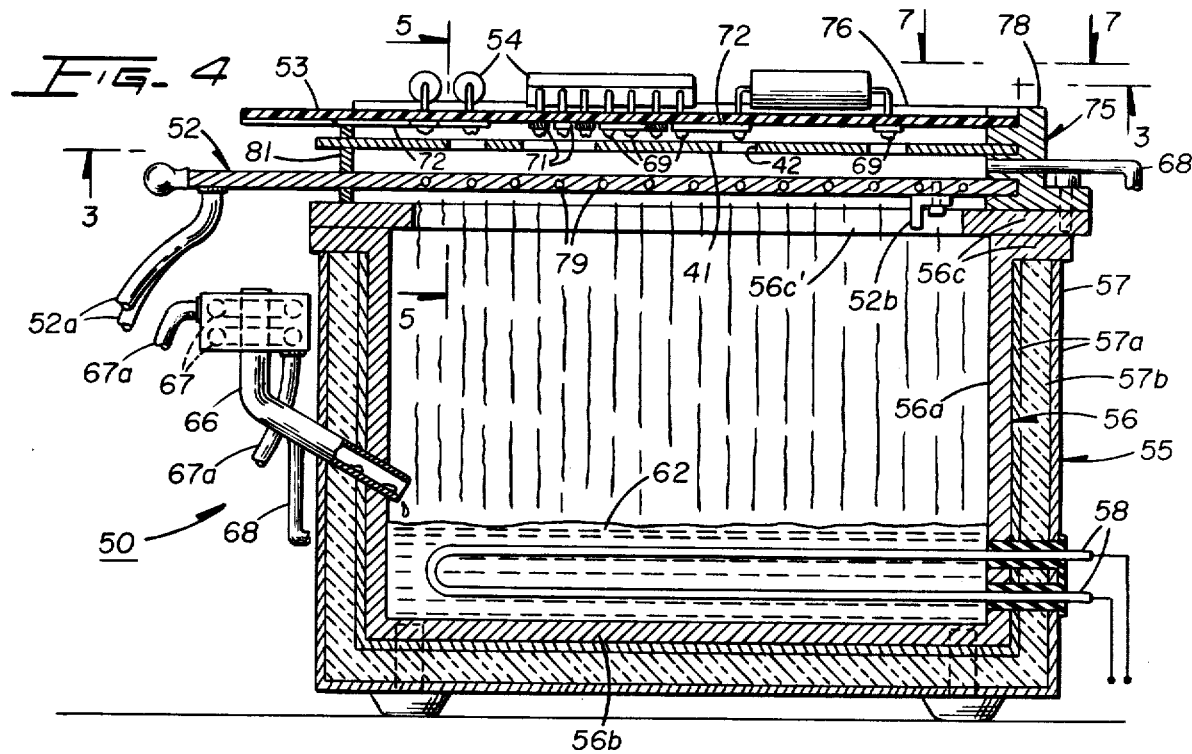
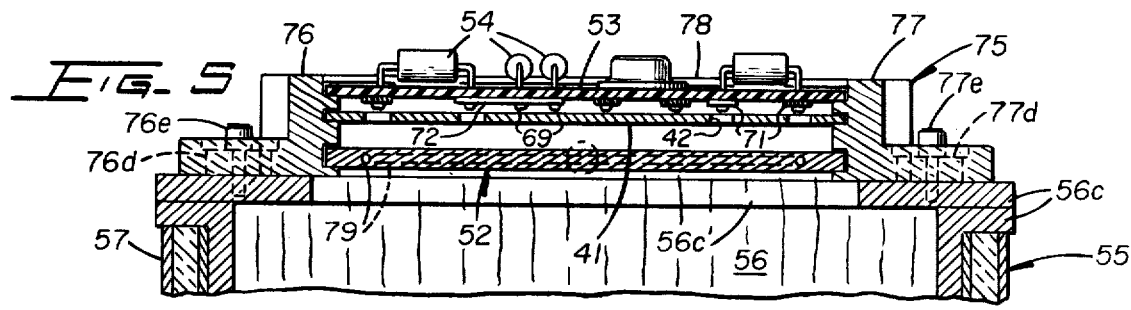

METHOD AND APPARATUS FOR GENERATING A CONTROLLABLY EXPOSED VAPOR BODY FOR HEATING ARTICLES

BACKGROUND OF THE INVENTION

1. Field of the Invention

This invention relates to the vapor condensation heating of articles to an elevated temperature and, more particularly, to a method and apparatus for generating a hot saturated vapor body that is controllably exposed to only a selected surface of an article to be heated, while continuously minimizing any loss of the vapor to the atmosphere.

2. Description of the Prior Art

In performing a solder, fusing or brasing operation on an article, for example, it is necessary to heat the article to a predetermined elevated temperature sufficient to perform the desired operation thereon. While the present invention is not to be construed as limited to a particular type of heat-induced operation, the nature thereof is most readily understood in the context of performing a soldering (or unsoldering) operation on an article, particularly on one surface thereof, such as on a selected underside surface of a printed circuit board during the manufacture or repair thereof.

In that connection, it is realized that whenever two or more elements, one of which may comprise a component lead or terminal, and the other a metallized pad or land area of a circuit board, are to be solder-connected, such elements must be heated to an elevated temperature sufficient to melt an interposed solder coat (or preform), while simultaneously preferably protecting the elements to be joined from oxidation during the soldering operation. In a typical hand soldering operation, utilizing a soldering iron, as well as in a conventional wave soldering operation, a coating of flux has normally been required, and applied on at least the article areas to be soldered, in order to minimize any deleterious oxide surface build-up during soldering.

As a result of a need to perform mass (or selective) soldering or unsoldering operations on articles, such as on complex printed circuit boards, which, for example may required hundreds (or even thousands) of closely spaced connections to be soldered, while at the same time obviating the problem of surface oxidation in the absence of flux, there has recently been increasing use made of vapor condensation soldering processes and apparatus. One such process and apparatus of that type is the subject of U.S. Pat. No. 3,866,307 of R. C. Pfahl, Jr. et al., issued Feb. 8, 1975, assigned to the assignee of the present invention, and incorporated herein by reference.

In accordance with the teaching in the prior Pfahl et al. patent, the article to be soldered (fused or brazed) is placed within a vessel that is open to the atmosphere on the top side so as to facilitate the entry and removal of the article therefrom. Each article to be heated to a desired elevated temperature is immersed within a primary body of hot saturated vapor generated within the vessel, with a portion of the vapor body condensing on the article and transferring thereto its latent heat of vaporization. This heats the article to the temperature required to perform a soldering operation, for example, thereon. The hot saturated vapor body is generated by continuously boiling within the vessel a heat transfer liquid that is non-conducting, chemically inert, and has a boiling point at least equal to, but preferably above, the temperature required to melt the solder. Such a vapor condensation facility may also be employed to perform a mass re-flow soldering operation on a continuously moving line of articles.

The various preferred heat transfer liquids presently employed to heat articles in the manner described above, and which liquids are described in greater detail hereinbelow, are quite expensive. As such, any appreciable loss of the generated vapor in question to the atmosphere significantly impacts on the over-all costs incurred in carrying out a given soldering operation, particularly high volume, mass soldering operations.

One technique utilized heretofore to at least partially minimize the loss of the relatively expensive primary vapor to the atmosphere in an open top vessel has involved positioning a suitable cooling coil (or coils) about the inner sidewalls of the vessel at an elevation near the top thereof. Such a cooling coil (or coils) condenses any vapor that rises to the elevation of, and in the immediate vicinity of, the coils. This technique, however is not completely effective in condensing the major portion of the rising vapor in the central region of the vessel. A vessel that incorporates both a peripherially disposed cooling coil and a completely enclosing, but removable, top wall or cover is disclosed in U.S. Pat. No. 4,022,371 of E. R. Skarvinko et al. Such an apparatus, of course, not only requires the total immersion of the articles within the vapor, but the removal and repositioning of the cover plate from the vessel in connection with each heating operation, with the attendant loss of vapor to the atmosphere at such times.

A more effective technique recently developed to minimize the loss of the relatively expensive heat transfer liquid to the atmosphere, while in vapor form in an open top vessel, is the subject of U.S. Pat. No. 3,904,102 of T. Y. Chu et al., issued Sept. 9, 1975, also assigned to the assignee of the present invention. In accordance with the technique disclosed in the last-mentioned reference, a secondary body of vapor, generated by boiling a relatively inexpensive heat transfer liquid, is interposed between the relatively expensive primary body of vapor and the atmosphere. This technique substantially reduces loss to the atmosphere of the hot primary body of vapor confined therebelow.

Although such a secondary body of vapor has been found to be quite effective in reducing the losses of the expensive primary vapor, portions of both the primary and secondary vapors are nevertheless still lost to the atmosphere across the secondary vapor-air interface. One reason for this is believed to be the disturbance produced at the primary-secondary vapor interface when normally generating the secondary vapor. The dual vapor losses in question are at least substantially further minimized, however, in accordance with a method and apparatus for more effectively maintaining the secondary vapor body, disclosed in U.S. Pat. No. 4,055,217 of T. Y. Chu et al., issued Feb. 2, 1976, also assigned to the assignee of the present invention.

With respect to all of the aforementioned dual vapor body generating condensation systems, it is appreciated, of course, that the articles to be heated must be passed downwardly through the upper secondary vapor body in order to be immersed in the primary vapor body. This presents no serious problem with respect to many articles, including certain types of printed circuit boards with only printed circuitry thereon, or having components and/or devices mounted thereon which are not adversely affected by the elevated temperatures of the primary vapor body, in particular.

In an ever-increasing number of mass soldering circuit board applications today, however, the mounted active and passive electronic devices and/or components, particularly when of the solid state integrated circuit type, cannot be safely subjected to a hot saturated vapor body for even relatively short periods of time, and especially at the elevated temperatures required for soldering. In such cases, and with particular reference to circuit boards, with components mounted on only one side, it would be very desirous to controllably expose only the non-component, printed circuit side thereof to be soldered (hereinafter referred to simply as the underside) to a single hot, saturated (primary) vapor body confined within a vessel, i.e., with no immersion of the completely assembled circuit board within the vapor body.

Such a technique would also be of considerable advantage in the repair of circuit boards, wherein both unsoldering and resoldering operations are normally involved. In this regard, it would likewise be very beneficial if only selected discrete areas on the underside of the circuit board would have to be subjected to the heat of vaporization of a generated body of vapor while, at the same time, minimizing the loss of any vapor to the atmosphere in the absence of any overlying secondary vapor blanket.

One technique employed heretofore to heat only the underside of a printed circuit board in a vapor condensation apparatus has involved a vessel which incorporated a horizontally disposed, and retractable planar cover plate. The latter was dimensioned and adapted to allow the selective closure of a central opening formed in the top wall of the vessel. Associated mounting structure secured to the top wall of the vessel allowed a circuit board to be supported thereon at an elevation immediately above the cover plate in such a manner that either the latter, or the circuit board, could be selectively employed to effectively close the upper top wall vessel opening, so as to prevent loss of vapor to the atmosphere therethrough.

While the latter apparatus was of simplified and inexpensive construction, and allowed controllable heating of only the underside of a circuit board (or any similar type substrate), it unfortunately was found to still allow an appreciable amount of the hot body of vapor generated within the vessel to be periodically lost to the atmosphere. This would happen each time a small amount of the vapor would become entrapped between the underside of each successively mounted circuit board and the adjacent upper surface of the cover plate. This could occur, of course, as a result of the following sequence of operations: (1) mounting a circuit board on the top side of the vessel, so as to overlie the opening therein, while the retractable cover plate is also in a fully extended vessel-closing, underlying position; (2) retracting the cover plate to expose the underside of the circuit board to the hot vapor body therebelow; (3) advancing the cover plate so as to agin close the top side of the vessel, while simultaneously isolating the major (as distinguished from minor) portion of the vapor body therebelow, and finally, (4) removing the soldered (or unsoldered) circuit board from the vessel, which allows the minor (entrapped) portion of the vapor body to escape to the atmosphere.

As the cover plate in the last mentioned prior apparatus did not incorporate any means for cooling the major surfaces thereof, it could not effectively condense my of the relatively expensive entrapped vapor that would ultimately be lost to the atmosphere. With the preferred types of heat transfer liquid, as previously noted, being relatively expensive, the resulting cumulative vapor losses in apparatus of the type in question could very readily adversely affect the total costs incurred, for example, in any high volume mass soldering operation.

An article entitled "Solvent Vapor Solder Reflow", by E. G. Dingman, IBM Technical Disclosure Bulletin, Vol. 13, No. 3, dated August 1970, describes the use of a boiling solvent (such as that sold under the tradename "Freon E5", by E. I. DuPont de Nemours and Company) to facilitate the removal and resolder of electronic components during printed circuit board rework operations. It is stated therein that "The solvent condenses only on the areas having a temperature lower than the boiling point of the solvent used. This releases the heat of vaporization and enables solder rework operations with materials and components that are heat sensitive. The rapid and selective application of heat to small areas with high thermal conductivity is possible within a matrix of material which is heat sensitive and cannot tolerate high temperatures." While this disclosure discusses the rapid and selective application of heat to small areas of high thermal conductivity, such as the metallic pads, land areas, lead ends and circuit paths, of printed circuit boards, there is no suggestion of how to controllably expose a hot saturated vapor body either to only one surface of a printed circuit board having both low and high thermal conductivity areas thereon or, alternatively, to only selective discrete regions encompassed within the areas of high thermal conductivity. Moreover, no physical structure is either illustrated, or described, for accomplishing even the described mode of operation and, particularly, in relation to simultaneously preventing or minimizing loss of vapor to the atmosphere.

It was further appreciated heretofore that prior art apparatus existed of the type that required the confinement of an article within a vapor generating vessel incorpoing some form of a fixed and cooled top wall or cover. For example, B. Juettner U.S. Pat. No. 2,716,348 discloses a vessel with a horizontally disposed, water-cooled, top-enclosing cover plate (removable but not retractable). K. A. Holm et al. U.S. Pat. No. 3,479,252 discloses a vessel with water-cooled sidewalls and an air-flow, channel-defining stationary top wall which is formed with a permanent article-receiving opening in a central region thereof.

From the foregoing, it is thus seen that none of the discussed prior art discloses selective means for closing an otherwise open top of a vapor condensation vessel in such a manner that only the underside surface of an article (or a patterned area thereof) may be controllably exposed to, and heated by, a body of hot saturated vapor generated therewithin, while simultaneously minimizing any loss of the vapor to the atmosphere at all times.

SUMMARY OF THE INVENTION

In accordance with the principals of the present invention from a method standpoint, an article to be heated is positioned at a first elevation relative to an initially co-extensive body of vapor generated within a vessel such that only a selected underside surface area of the article (or a patterned area thereof) is exposed to and heated by the vapor, while the article at the same time, at least in part, facilitates the confinement of the body of vapor below the first elevation, and within the vessel, so as to minimize the loss thereof to the atmosphere. After the completion of a vapor-induced heating operation on the underside surface of the article, the major portion of the initially co-extensive body of vapor is confined below a a second elevation at or near the top side of the vessel, but below the article, so as to isolate the latter from the major portion of the body of vapor. Any minor problem of the initially co-extensive body of vapor that is entrapped between the second isolating elevation therefor and the underside of the positioned article, prior to the removal of the latter, is cooled and condensed. The resulting condensate is then directed, preferably by gravity flow, back to the base region of the vessel for reboiling.

In accordance with several preferred illustrative embodiments of the invention, an internally cooled cover plate is mounted for retractable movement on a vapor generating, open top vessel at an elevational such that while in a first extended position, it substantially completely closes the otherwise open top of the vessel, thereby, minimizing any loss of vapor to the atmosphere, whereas when it is in a second fully retracted position, the underside of a previously positioned, top side vessel-supported article is then exposed to, and heated by, the body of vapor. While so positioned, the article also simultaneously functions to close the then otherwise open top of the vessel and, thereby, likewise insures the minimizing of any loss of vapor to the atmosphere.

After a heating operation has been performed on the article, the cover plate is again displaced inwardly to its first vessel-closing position. At that time, any minor portion of the initially co-extensive body of vapor that has become entrapped between the cover plate and the article, prior to the removal of the latter, is cooled by and condensed on the upper chilled surface of the internally cooled cover plate for reuse.

In accordance with another aspect of the invention in one preferred embodiment, the cover plate is preferably mounted at a predetermined inclined angle relative to a horizontal reference plane, and is formed with an array of spaced grooves along the forward edge thereof. This allows any of the hot vapor that is condensed on the upper surface, in particular, of the cover plate, while in its fully extended position (to substantially completely close the top of the vessel), to flow by gravity through the grooves, and down the adjacent sidewall to the base region of the vessel for re-boiling. Alternatively, in accordance with another preferred embodiment, scraper members are employed to remove any condensate from the internally cooled cover plate when it is desired to mount it horizontally.

In accordance with still another aspect of the invention, a patterned, apertured mask may be interposed between the cover plate, while in its vessel-closing position, and a vessel-mounted article, such as a circuit board, so that the generated body of vapor within the vessel will directly impinge on and heat only selected discrete patterned areas or regions, on the underside of the circuit board. This may often be desirous, for example, when certain portions of the circuit board, for example, cannot be subjected to elevated temperatures for any appreciable period of time, if at all, and in situations where only certain connections on a circuit board must be unsoldered, and thereafter resoldered, for purposes of repair or parts replacement.

In view of the foregoing, it is seen that the subject methods and apparatus provide simplified and effective ways of utilizing only a single heat transfer liquid-generated vapor body to controllably and directly heat only a selected article underside surface (or patterned area thereof), while at all times minimizing loss of vapor to the atmosphere.

BRIEF DESCRIPTION OF THE DRAWINGS

FIG. 1 is an elevational side view, primarily in section, of one preferred vapor condensation heat transfer apparatus embodying the principles of the present invention:

FIG. 2 is an enlarged, fragmentary sectional view, taken along the line 2—2 of FIG. 1, of the forward edge of the cover plate, configured so as to allow condensate formed on the upper surface thereof to flow between the forward edge and the adjacent vessel sidewall to the base region of the vessel, in accordance with the principles of the present invention;

FIG. 3 is an enlarged plan view, taken along the line 3—3 of FIG. 4, illustrating the use of a planar mask, having patterned openings formed therein, for exposing only desired and aligned ones of a plurality of solder connection sites on the underside of the circuit board of FIG. 4, for example, to a generated body of vapor;

FIG. 4 is an elevational side view, primarily in section, of another preferred embodiment of the invention which is similar to the apparatus depicted in FIG. 1, but distinguishes therefrom in being adapted to allow not only an article, such as a circuit board, but a retractable cover plate, and optional mask, to all be mounted on a partial top wall of the vessel;

FIG. 5 is an enlarged, fragmentary elevational front view, primarily in section, of the apparatus of FIG. 4, taken along the line 5—5 of the latter FIG.;

FIG. 6 is an enlarged, fragmentary, perspective view of the adjustable guide rail assembly, including a combination scraper and slot-sealing member, of the apparatus of FIG. 4, for not only supporting the article and mask, neither shown, but the retractable cover plate;

DETAILED DESCRIPTION OF THE INVENTION

Figure 7:
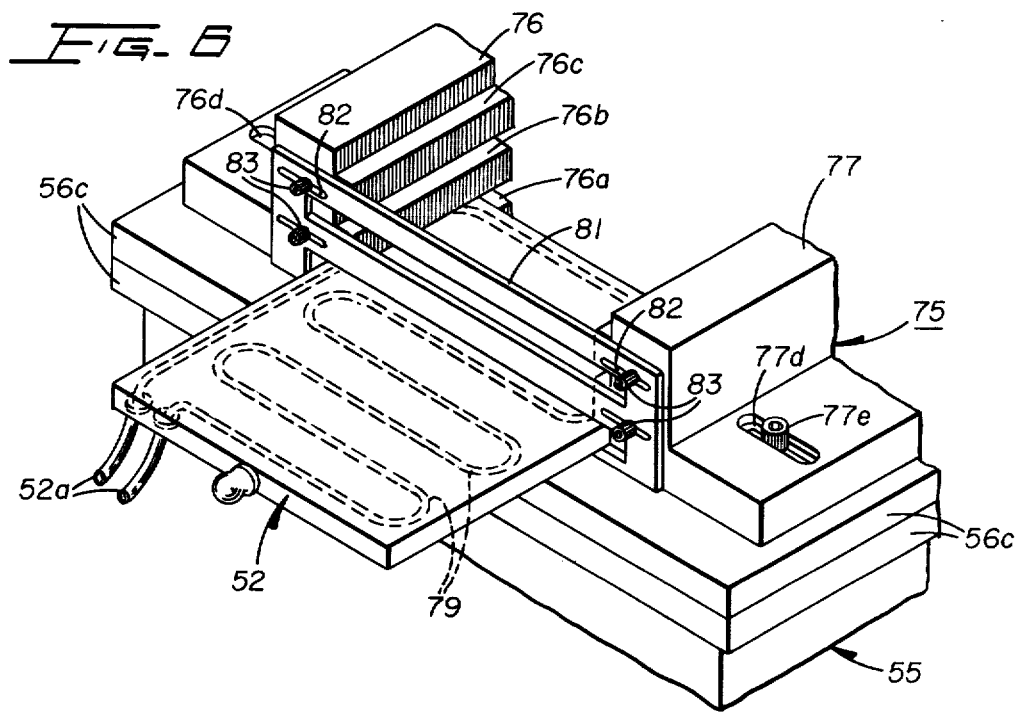
FIG. 7 is an enlarged, fragmentary plan view taken along the line 7—7 of FIG. 4, showing in greater detail the adjustable relationship between the spaced pair of guide rails, and the rearward stop member associated therewith.

It should be appreciated that the methods and vapor condensation apparatus as embodied herein, and described in detail hereinbelow, have universal application in heating diverse types of articles in order to perform any one of a number of different types of heat-dependent operations thereon. However, for purposes of illustration, the subject invention is disclosed herein in connection with one preferred application, namely, in performing mass (or selective) soldering (or unsoldering) operations on printed circuit boards.

With particular reference first to FIG. 1, there is depicted one preferred vapor condensation apparatus, identified generally by the reference numeral 10, embodying the principles of the present invention. This apparatus comprises a vessel 11, preferably formed of a suitable heat resistant metal, such as stainless steel, with integral and stationary sidewalls 11a and a base 11b, and having an open top that is selectively closed by an internally cooled and retractable cover plate 15, the latter being constructed and mounted on the vessel in accordance with unique aspects of the invention described in greater detail hereinbelow.

The sidewalls 11a and base 11b of the vessel 11 are preferably covered with a layer 17 of suitable heat insulating material, such as of fiberglass or asbestos. The vessel additionally includes a conventional heating element or coil 18, suitably mounted in the base region of the vessel and which, for example, is preferably electrically operated through external leads 18a. Such a coil is employed to boil a desired heat transfer liquid 19, initially introduced into the vessel to a suitable level indicated, for example, by the reference numeral 19a. The heat transfer liquid preferably is of the type having a number of desired characteristics described in greater detail hereinbelow. The heat generated by the heating coil 18 may be supplemented by an external source of heat applied to the base 11b of the vessel 11, such as by a hot plate or the like (not shown). In the latter case, of course, the outer layer of insulating material 13 covering the base of the vessel would be removed.

A stationary vent pipe 21, which preferably has a cooling coil 22 surrounding an upper terminating end region thereof, is employed to insure that the interior of the vessel is maintained at approximately atmospheric pressure, while simultaneously minimizing vapor loss to the atmosphere therethrough. The cooling coil is connected through suitable tubes 23, 24 to a conventional fluid source 26, which preferably includes a pump, for re-circulating coolant (e.g., chilled water) through the cooling coil.

In accordance with the principles of the present invention, as embodied in the apparatus of FIG. 1, the upper open end of the vessel 11 is selectively closed by means of the aforementioned uniquely constructed cover plate 15. The latter is mounted for rectilinear displacement, relative to the vessel 11, from a first vessel-closing position, depicted in solid line form, to a vessel-opening position depicted in phantom. The cover plate is also preferably mounted at an inclined angle relative to a horizontal reference plane, such as on the order of 5° to 30°. While the angle of inclination is not critical, it should be sufficient to effect reliable run-off of condensate from the major surfaces thereof, while at the same time keeping the area between the cover plate, in its vessel-closing position, and the underside of a vessel-mounted circuit board as small as possible, so as to minimize the amount of possible vapor that can become entrapped therein. The inclined positioning of the cover plate 15 is accomplished by confining the latter within a slot 27 formed in one sidewall 11a of the vessel, with the two mutually disposed cover plate edge regions that are parallel to the path of travel thereof being received in, and key-way guided along, inclined grooves 28, depicted in FIG. 2, which are formed in the respectively adjacent sidewalls of the vessel. It should be appreciated, of course, that the side edge regions in question of the cover plate 15 could also rest on, and be guided along, suitable channel members (not shown) secured to the respectively associated sidewalls 11a of the vessel.

A knob-shaped handle 15a is illustratively shown secured to and near the outer edge of the cover plate so as to facilitate the manual rectilinear movement thereof from its vessel-closing to its vessel-opening position, and vice versa. A suitable stop member 15b, in the form of a bracket, is shown secured to the cover plate near the forward edge 15c thereof to prevent its complete retraction from within the vessel sidewall slot 27.

The lower forward edge 15c of the inclined cover plate, as best seen in FIG. 2, is also formed with a plurality of grooves or slots 15c' that allow any condensate that may form on the upper surface 15d thereof to flow, by gravity, through the slots to the base region of the vessel. It is appreciated, of course, that grooves could alternatively be formed in the inner surface of the vessel sidewall 11a adjacent the forward edge of the cover plate, when the latter is fully extended inwardly, to accomplish the same desired end result.

As also seen in FIGS. 1 and 2, the cover plate 15 significantly and importantly incorporates a cooling coil 29, preferably arranged along a serpentine path between the major inner and outer walls thereof in any suitable manner. The cooling coil 29 is coupled at opposite ends through suitable flexible conduits, or tubes, 31 and 32 to the fluid source 26.

By utilizing such an internally cooled and tilted cover plate, any hot vapor that may become entrapped between the upper surface 15d of the cover plate, while in its fully extended or vessel-closing position, and the underside of a vessel-mounted circuit board 36, for example, will condense on the upper surface of the cover plate. The resulting condensate will then freely flow by gravity down the inclined cover plate, through the plurality of slots 15c' formed along the lower forward edge thereof, as depicted in FIG. 2, and finally downardly along the adjacent vessel sidewall 11a to the remaining non-vaporized heat transfer liquid confined in the base region of the vessel 11.

It should be appreciated that if the cover plate 15 were not internally cooled, of course, any hot vapor entrapped between the latter and the circuit board 36 (or any other vessel-supported and enclosing article), would be periodically lost to the atmosphere, e.g., each time a heated circuit board was removed from the vessel. In high volume, mass soldering operations, such cumulative vapor losses could constitute a significant portion of the overall costs incurred in a given circuit board soldering application.

In order to insure that any entrapped vapor between the cover plate 15, while in its vessel-closing position, and the underside of the circuit board, is maintained at substantially atmospheric pressure while being condensed, an auxiliary vent pipe 37 is employed. As illustrated, this vent pipe is coupled to the vent pipe 21, so that any non-condensed vapor that passes therethrough will ultimately be condensed by the cooling coil 22 associated with the vent pipe 21. If desired, of course, a separate cooling coil could be associated with the vent pipe 37. It should also be appreciated that the vent pipe 37 in a given vapor condensation apparatus may not even be required, the the need therefor depending primarily on the amount of leakage that exists above the cover plate when in its vessel-closing position, or that can be tolerated, for a given article heating application.

In connection with the construction of the vessel 11 in the apparatus 10 of FIGS. 1 and 2, the upper edges of the vessel sidewalls 11a are not only adapted to directly support the article to be heated, such as the illustrative circuit board 36, but the cross-sectional open top area of the vessel is also preferably chosen such that the various codes of circuit boards to be heated will completely close the vessel top, i.e., independently of the cover plate whenever the latter is not in its fully extended (solid-line) position. In situations when this is not practicable because of the size of the circuit boards and/or the vessel, a suitable metal frame or mask (not shown) dimensioned to extend across the open top of the vessel, and formed with a central opening corresponding to only the underside surface area of the circuit board to be heated, may be readily interposed between the top edges of the vessel sidewalls and the underside of the circuit board.

In accordance with another related aspect of the invention, as illustrated in FIG. 3, primarily concerned with a second preferred embodiment of the invention illustrated in FIG. 4, a patterned mask 41, such as of stainless steel, and formed with any desired number of selectively dimensioned and located windows 42, may be readily interposed between the body of vapor, when the cover plate 15 is in its fully retracted (phantom) position, and a circuit board 36 (or 52 in FIG. 4) is mounted on the vessel thereabove. Such a mask advantageously results in the hot saturated vapors generated within the vessel being directly exposed to, and heating, only the desired precisely defined and discrete solder connection areas on the underside of the circuit board which are respectively aligned with the mask-defined windows 42 depicted in FIG. 3. This may be of particular advantage, for example, with respect to the repair of circuit boards, such as when only one or several soldered connections are to be unsoldered and, after component replacement, resoldered, or when certain areas of a circuit board supporting very heat sensitive components cannot be subjected to the requisite temperature exhibited by the vapor without adversely affecting such components.

In connection with the general operation of the apparatus 10 of FIGS. 1 and 2 for heating articles, the heat transfer liquid 19 is introduced into the vessel 11 to the level indicated by the numeral 19a, as previously described, and brought to and maintained at a boiling state by means of electrical current from a source (not shown) applied through the lead-in wires 18a to the heating coil 18. With particular reference to soldering applications, the heat transfer liquid employed should exhibit the following general properties:

(a) a boiling point at atmospheric pressure at least equal to, and preferably slightly above, the temperature required for the operation to be performed (i.e., soldering, fusing, brazing, curing, cooking, etc.), for example, in a soldering operation, this boiling point is at least equal to and preferably above, the melting point of the solder used in the operation;

(b) must produce a saturated vapor which is denser than air at atmospheric pressure;

(c) desirably have a well defined and substantially constant boiling point for better control over the process, and (d) desirably produce a saturated vapor which is non-oxidizing, chemically stable and inert, non-toxic and non-inflammable.

In addition to the general properties hereinabove recited, when the methods and apparatus for its practice are employed to heat a printed circuit board having various leaded electrical components 43 to be soldered thereto, the single heat transfer liquid should also normally not be electrically conducting.

When utilizing a solder that melts, for example, at 369° F. (182.2° C.), for a particular printed circuit board soldering application, one preferred heat transfer liquid is a formulation selected from the group of liquids known generically as Fluorocarbons, such a fluoronated polyoxypropylene. One such liquid is sold by E. I. DuPont de Nemours and Company, under the tradename "Freon E5", and has the following specific and significant properties:

Boiling point at atmospheric pressure—435.6° F. (224.2° C.).

Electrical Resistivity—greater than $4 \times 10^{14}$ ohm-cm.

Dielectric constant—2.45.

Latent heat of vaporization—19.9 btu./lb.

Density of saturated vapor at boiling point.

Atmospheric pressure—1.45 lb/ft$^3$.

Chemical stability, inertness, non-toxicity and non-flammability.

Another suitable heat transfer liquid applicable for use with the afoementioned type of solder is sold by the Minnesota Mining and Manufacturing Company under the tradename "Flourinert FC-70", and has the following significant properties:

Boiling point at atmospheric pressure—419° F. (215° C.).

Dielectric constant—1.94.

Latent heat of vaporization—23 btu/lb.

Density of saturated vapor at boiling point.

Atmospheric pressure—1.27 lb/ft.$^3$

Chemical inertness, non-toxicity and non-flammability.

With respect to both "Freon E5" and "Flourinert FC-70", they are also electrically non-conducting.

Two additional heat transfer liquids that substantially exhibit the above-defined properties, but to a lesser extent than "Freon E5" and "Flourinert FC-70", are "Freon E4", sold by the E. I. DuPont de Nemours and Company, and perchlorethylene. With respect to "Freon E4", "Freon E5" and "Flourinert FC-70", they have all been found to work particularly well not only with solder melting at approximately 359° F. (182.2° C.), but with tin-lead-eutectic solder, in general, whereas perchlorethylene has been found to work most effectively with tin-indium-cadmium solder.

With reference again to the operation of the apparatus 10 illustrated in FIGS. 1 and 2, it is assumed at this point that a proper amount of heat transfer liquid has previously been introduced into the vessel 11 and heated to its boiling point by the heating coil 18 alone, or in conjunction with external heat also applied to the vessel, such as to the base thereof by means of an auxiliary hot plate. When the heat transfer liquid is heated to a boiling state, a body of hot saturated vapor 19b is generated and confined within the vessel by either the cover plate 15 or or by the underside of the vessel-mounted circuit board 36. Should the underside surface area of the circuit board 36 be less than the open area defined by the vessel sidewalls, a suitable frame (not shown) or mask 41, as previously described, may be optionally interposed between the cover plate 15 and the circuit board 36.

In any event, after the circuit board 36 has been directly or indirectly mounted on the vessel 11, the internally cooled cover plate 15, which prior to that time has been positioned so as to substantially completely close the otherwise open top of the vessel, is displaced to its fully retracted position, shown in phantom in FIG. 1. At that time the hot saturated vapors from the generated body 19b thereof rise to the exposed underside surface area (or areas) of the circuit board and condense thereon, giving up their latent heat of vaporization to heat that surface, and particularly, the solder connection sites thereon. Typical solder connection sites, identified by the reference numeral 44 on the underside of the circuit board 36, would comprise through-hole extending lead ends of the components 43, which lead ends are respectively surrounded by printed circuit land areas or pads 46, the latter being selectively connected to printed circuit paths 47.

The temperature of these heated sites will rise until the solder thereon is near or reaches the temperature of the saturated vapor body. That temperature, of course, is the boiling point of the heat transfer liquid employed, and must at least equal, but preferably be slightly higher than, the melting point of the particular solder employed. By way of example, for a solder having a liquidus temperature of approximately 359° F. (182° C.), the boiling temperature of the heat transfer liquid should preferably be from 10° to 50° higher than the solder liquidus temperature. In a typical circuit board soldering application, the solder may be initially applied to the circuit boards either in the form of solder pre-forms, or in the form of a general solder coat applied thereto, with the vapor-induced re-flow of the solder pre-forms, or solder coat, being required to effect reliable and permanent soldered connections.

Advantageously, the exposed metallic surfaces on the underside of the circuit board 36 approach or reach the temperature of the hot saturated vapor body quite rapidly, because the heat transfer coefficients for vapor condensation processes are among the highest ones known for any mode of heat transfer. This significantly minimizes the time required for the circuit board to be subjected to the heat of the saturated vapor body. As such, the time is very short during which there could be any possible thermal degradation of any heat sensitive electrical components mounted on the top side of the circuit board.

After the soldering (or unsoldering) operation, the internally cooled cover plate 15 is displaced from its fully retracted (phantom) position depicted in FIG. 1. to its fully extended (solid line) position so as to again substantially completely close off the otherwise open top of the vessel and, hence, isolate the then heated circuit board 36 from at least the major portion of the continuously generated body of hot vapor therebelow.

At that time, any minor portion of the original hot vapor body that may have become entrapped between the upper surface 15b of the internally cooled cover plate and the underside of the printed circuit board 36, as previously noted, is advantageously condensed on the cover plate. With the latter preferably tilted at a slight angle, as shown in the illustrative embodiment of FIG. 1, the condensate formed thereon freely flows by gravity through the grooves 15c', formed along the lower forward edge 15c thereof (see FIG. 2), and then along the adjacent vessel sidewall 11a to the base region of the vessel.

The condensing of this entrapped vapor, of course, substantially minimizes the cumulative loss of the relatively expensive heat transfer liquid-generated vapor to the atmosphere. The cooling coil 22 associated with the vent pipe 21 likewise contributes to minimizing any loss of the vapor to the atmosphere, while at the same time allowing the generated vapor body to remain at approximately atmospheric pressure at all times, as required in order to obtain consistently uniform heating of articles, in general, with a vapor condensation process.

It will also be appreciated that any condensate collected on the upper surface of the internally cooled cover plate could also be removed therefrom in any one of a number of other ways that would not require the tilting thereof.

For example, the vessel sidewall slot 27, by being dimensioned to accommodate the cover plate 15 in close-fitting relationship, would inherently result in the peripheral contacting surfaces of the slot functioning to scrape off any condensate that may be formed on either major surface of the cover plate during the retraction thereof. Alternatively, suitable adjustable scraper members 48, shown in phantom in FIG. 1, such as of stainless steel, or of a plastic such as Teflon ®, may optionally be adjustably positioned along opposite, laterally disposed inner edges of the slot 27, in contacting relationship with the cover plate to remove any condensate from the internally cooled major surfaces thereof. Such scraper members may be adjustably secured to the inner surface of the slotted vessel sidewall 11a, such as by means of threaded fasteners 49, for example. As thus positioned, the scraper members would insure the complete removal of any condensate from the cover plate during the retraction thereof, regardless of the tolerances of the vessel-defined slot, and/or the angle of inclination, if any, of the cover plate relative to a horizontal reference plane.

In addition, scraper members of the type in question could readily function to more effectively seal the slot 27 and, thereby, further minimize the loss of any vapor therethrough to the atmosphere. In this connection, it should also be appreciated that the scraper members may be made with a thickness dimension, and/or out of a suitable material, so as to be at least slightly resilient, and/or be mounted in a spring-biased manner, so as to further insure continuous contact with the cover plate surfaces 15d and 15e at all times.

From the foregoing, it is seen that the first illustrative method and structural embodiment of the invention significantly provides an effective and simplified way of confining only one heat-producing vapor body within an open top vessel, i.e., with no secondary vapor blanket being required to minimize vapor loss to the atmosphere. while simultaneously allowing the vapor body within the vessel to be controllably exposed to, and heat, only the underside surface (or selected discrete areas thereof) of a vessel-mounted article.

FIGS. 4-6 illustrate a second preferred embodiment of the invention wherein a vapor condensation apparatus 50 distinguishes primarily over the apparatus 10 of FIGS. 1 and 2 with respect to the manner in which a retractable cover plate 52, and article, such as a circuit board 53 with components 54 to be soldered thereto, an optional patterned mask 41 (previously described in connection with the first embodiment, and with specific reference to FIG. 3), are all mounted in a unique manner, to be described in greater detail hereinafter, on an insulated vessel 55. As illustrated, composite vessel 55 is comprised of an inner metallic liner 56, such as of stainless steel, which forms sidewalls 56a, a base 56b and a partial top wall 56c, and an insulating jacket 57, formed of two thin metallic sheaths 57a separated by an insulating layer 57b, such as of fiberglass or asbestos, surrounding the outer surfaces of the vessel base and sidewalls.

It is understood, of course, that the particular construction of the insulating walls and base may take any one of a number of different forms, including the simplified form illustrated in FIG. 1, or in certain applications may be eliminated completely. An uninsulated vessel may be feasible, for example, when the vessel is used on only a limited basis in the repair of articles, and/or when the vessel is of very small dimensions, thereby, presenting neither a serious heat loss problem nor a serious danger to operating personnel.

The apparatus 50, as the apparatus 10, also incorporates a suitable heating coil 58 to boil a heat transfer liquid 62 when introduced into the vessel. Such a heating coil may be utilized alone or in conjunction with an auxiliary exterior heat source, such as a hot plate. In the latter case, of course, the base 55b of the vessel would not be insulated. A vent pipe 66, preferably associated with a cooling coil 67 is also provided not only to maintain a generated body of vapor within the vessel 55 at approximately atmospheric pressure, but to simultaneously minimize any loss of the vapor to the atmosphere through the vent pipe. The cooling coil 67 is connected through tubes 67a to a fluid source (not shown) for re-circulating a coolant in a manner as illustrated in FIG. 1.

A vent pipe 68 communicates with the vessel area defined between the cover plate 52, while in its vessel-closing position, and the underside of a mounted circuit board 53, so as to maintan any entrapped vapor at approximately atmospheric pressure while the latter is progressively condensed on the surface of the cover plate. As in the case with the vent pipe 37 of FIG. 1, the vent pipe 68 for purposes of illustration is shown coupled to the vent pipe 66 so as to insure that vapor passing therethrough is condensed by the cooling coil 67. A separate cooling coil could be employed for that purpose, of course, if desired.

In contrast to the vessel 11 of FIG. 1 formed with a completely open top, the vessel 55 is constructed with the aforementioned partial top wall 56c, within which a central opening 56c' is formed. This opening is preferably dimensioned so as to allow the desired underside surface area of any particular article, such as of the circuit board 53, to be exposed to, and heated by, the hot body of vapor therebelow and, thereby, effect a soldering, fusing or brasing operation, for example, on such surface. Should there be a need to heat only selected discrete areas on the underside of the illustrated circuit board, then the aforementioned optional mask 41, formed with a suitable pattern of windows 42, such as depicted in FIG. 3, may be readily interposed between the internally cooled cover plate 52 and the circuit board 53 (or any other similarly configured and vessel-mounted substrate). In this manner, only discrete solder connection sites 69 may be heated, such sites typically being comprised of through-hole lead-ends of components 54, connected by solder to respectively surrounding pads or land areas 71, which form a part of printed circuit paths 72.

In accordance with the principles of the second preferred embodiment, the cover plate 52, optional patterned mask 41, and circuit board 53 are all mounted on a guide rail assembly 75, comprised of a pair of guide rails 76, 77 (best seen in FIGS. 5 and 6), and a stop member 78, all secured to the partial vessel top wall 56c, formed as an integral section of the upper retractable sidewall section 13. The guide rails 76, 77 are disposed in parallel relationship on opposite sides of the top wall central opening 56c', and are each formed with three longitudinally extending and closely spaced grooves 76a–c (or 77a–c). The grooves in each guide rail are dimensioned to respectively receive longitudinally disposed edge portions of the cover plate, mask (optional) and circuit board, respectively. It is appreciated, of course, that the grooves in each guide rail 76, 77 are respectively aligned with those corresponding thereto in the other guide rail so as to maintain the cover plate, optional mask and article in proper spatial relationship at all times. If desired, undercut shoulders (not shown) rather than the upper grooves 76c, 77c could be formed in the guide rails so as to allow the circuit board to be readily nested within the resulting recessed areas thereof from the top side.

Each of the guide rails 76 and 77 are also preferably formed with a plurality of key-way adjusting slots 76d, 77d (best seen in FIG. 6) that are oriented so as to allow the spacing between the guide rails to be adjusted, through the use of threaded fastners 76e, 77e, to accommodate circuit boards (or other articles) having different width dimensions. In this regard, it is appreciated that a different optional mask 41 (or simple frame) may be required in certain situations to correspond with either the total cross-sectional area, or the area to be heated, of a given circuit board. Conversely, different matched pairs of guide rails similar to 76 and 77, but having support grooves formed therein with different predetermined depths (not shown), could also be employed to accommodate a number of different width and/or length dimension-combinations for the circuit board, cover plate and mask.

The stop member 78 interconnects two common ends of the guide rails 76 and 77, and preferably is also formed with three grooves 78a, b and c that are respectively aligned with the corresponding and adjacent grooves in the guide rails so as to receive the forward edge regions of the cover plate 52, optional mask 41 and circuit board 53, respectively. Such a grooved stop member thus also contributes in minimizing loss of vapor generated within the vessel to the atmosphere.

Also in accordance with the principles of the present invention, the cover plate 52 advantageously incorporates an internally disposed cooling coil 79 through which a suitable coolant, such as chilled water, is circulated in a conventional manner. Such coolant is supplied through flexible tubes 52a connected to a fluid source (not shown), but of the type described in connection with the embodiment of FIG. 1, and identified by the reference numeral 26. As in the case with the vapor condensation apparatus 10 of FIG. 1, any hot vapor that becomes entrapped between the underside of a heated circuit board and the upper surface of the cover plate 52, after the latter has been positioned to substantially completely enclose the vessel, will condense on the cover plate.

With the cover plate 52 being mounted in a horizontal position in the second illustrative embodiment depicted in FIG. 4, it is important that means be provided to allow any condensate that is formed on the upper surface thereof to be directed back to the base region of the vessel, particularly after the retraction of the cover plate to a position limited by a stop member 52b. This is effectively and reliably accomplished as best seen in FIG. 6, by mounting a scraper plate 81, which also functions as a vapor sealing plate, on the front face portions of the guide rails 76, 77 so as to be in closefitting, adjustable relationship with the cover plate, in particular, but also with the mask 41 and circuit board 53. Such a scraper (and sealing) plate may be formed out of any suitable material that is capable of withstanding the temperature of the generated body of vapor, and which also exhibits good wearability, and preferably at least a slight degree of resiliency. The scraper plate 81 is also preferably provided with x-oriented adjusting slots 82, so as to allow suitable threaded fastener members 83 to position the plate relative to different side rail spacings.

It should also be understood that if there is no need for a mask 41 in a given application, scraper plate 81 may be replaced with a similar plate (not shown) that has no slot to accommodate a mask, thus further minimizing any loss of vapor to the atmosphere. In addition, it should be realized that separate pairs of adjustable scraping (and sealing) members (not shown) may be respectively associated with the cover plate, mask and circuit board so as to provide any degree of close-fit contact respectively therewith as deemed necessary for a given application. Each pair of such members could also be readily mounted in a spring-biased manner, if desired, so as to provide a continuous, positive, clamping type of contact against opposite sides of the cover plate, or mask, or circuit board interposed therebetween. In addition, it should be appreciated that one or more edges of the cover plate 52 and/or interior surfaces of the vessel sidewalls 56b, may be formed with a plurality of grooves (not shown, but similar to grooves 15c formed in the cover plate 15 of FIGS. 1 and 2) so as to facilitate the run-off of condensate formed on the upper surface of the cover plate prior to the retraction thereof. At that time, of course, the scraper plate 81 effectively removes any condensate that is on the major surfaces of the cover plate.

Figure 8:
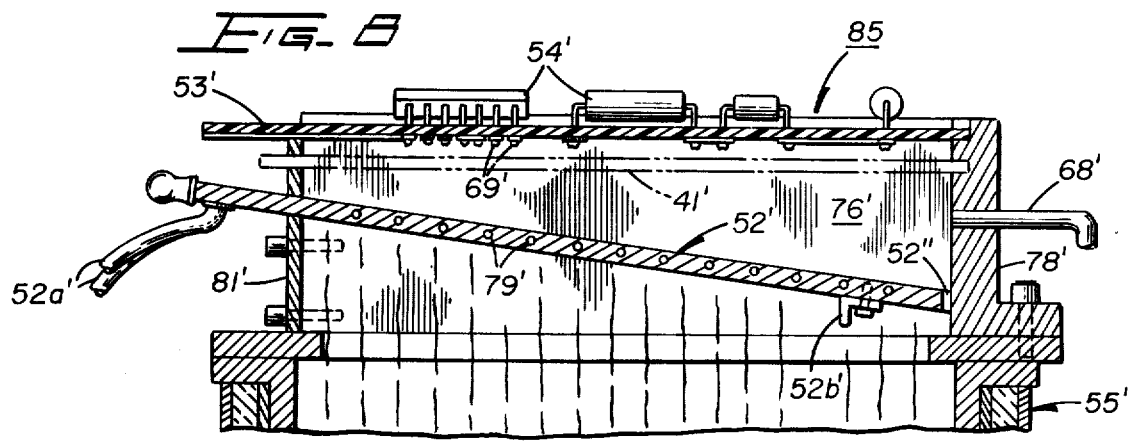
FIG. 8 is an enlarged, fragmentary side elevational view, mainly in section, of a vapor condensation apparatus similar to that of FIGS. 4-7, but distinguishing therefrom primarily by the manner in which the guide rail assembly is modified to mount the internally cooled cover plate at a predetermined angle relative to a horizontal reference plane so as to facilitate the run-off of condensate therefrom.

FIG. 8 illustrates a vapor condensation apparatus 85 which distinguishes over the apparatus 50 of FIGS. 4–7 by the mounting of a cover plate 52' at an inclined angle relative to a horizontal reference plane, as in the case with the cover plate 15 in the first embodiment of FIG. 1. As the basic structural elements in the apparatus 85 of FIG. 8 are otherwise either identical, or at least substantially similar to the corresponding elements in the apparatus 50 of FIG. 4, like, but primed, referenced numerals are used in FIG. 8 to show such correspondence. A mask 41' is shown in phantom to indicate that it is optional.

As previously discussed, in connection with the embodiment of FIG. 1, a tilted cover plate allows any condensate to simply flow by gravity off the major surfaces thereof, with a vapor-sealing plate 81', which may be similar or identical to the scraper plate 81 depicted in the embodiment of FIG. 4, not being required to effect the removal of the condensate in question. The inclined orientation of the cover plate 52' is readily accomplished in the embodiment of FIG. 8 by constructing the guide rails 76' and 77' (only the former seen) with sufficient height to allow the cover plate-supporting grooves (not seen) formed therein to be inclined at a predetermined angle, such as from 5°–30°, relative to a horizontal reference plane.

It is apparent, of course, that the cover plate 52' could also be readily mounted at a desired inclined angle by being supported in a horizontal vessel sidewall-slot, together with associated grooves or rails (not shown) associated with the vessel sidewalls on opposite sides of the slotted sidewall, as in the embodiment of FIG. 1, for example, if desired. Regardless in what manner the cover plate 52' is mounted in an inclined position relative to a horizontal reference plane, it is desirable to form the lower forward edges thereof with a plurality of grooves 52'' (as in the cover plate 15 illustrated in FIG. 2), so as to allow any condensate formed on the upper surface of the cover plate to flow by gravity through the grooves and then back to the base region of the vessel. Alternatively, of course, such grooves could likewise be formed in the inner surface of the vessel sidewall (not shown) opposite the forward edge of the cover plate.

Figure 9:
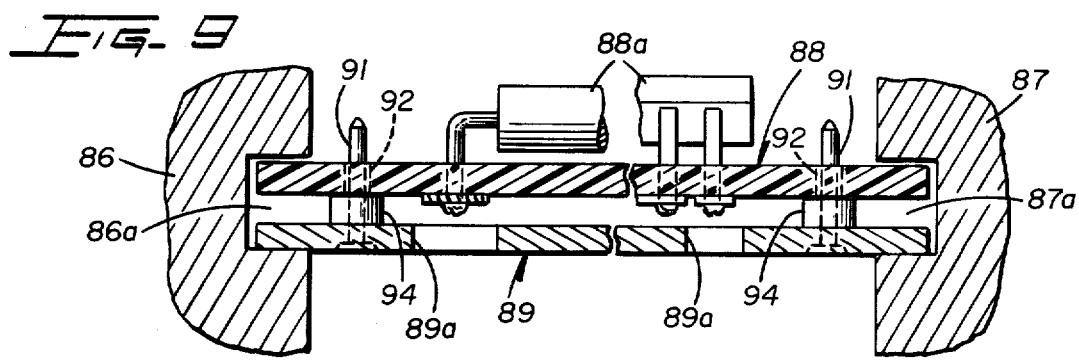
FIG. 9 is an enlarged, fragmentary front view, mainly in section, of a typical printed circuit board and patterned underlying mask, both supported along opposite corresponding edges within a common pair of respectively associated grooves formed in a modified guide rail assembly, with the mask and circuit board being maintained in proper alignment by pilot pins, secured to the mask, extending through pre-formed alignment holes in the circuit board.

In connection with the mask and circuit board supporting grooves formed in the guide rails 76, 77 of FIG. 4, or corresponding rails (only 76' seen) of FIG. 8, it should also be appreciated that in certain applications a single pair of spaced and aligned grooves may be employed to accommodate both of these elements. Such an arrangement is depicted in FIG. 9 wherein a pair of spaced guide rails 86, 87 are formed with respectively aligned grooves 86a, 87a that are dimensioned to accommodate both a circuit board 88, with components 88a mounted on only one side thereof, and a mask 89, with patterned openings 89a, positioned closely adjacent the underside thereof. This arrangement may be of particular advantage when close registration is required between discrete vapor-exposing apertures or windows formed in the mask, and aligned discrete areas on the underside of the circuit board to be heated. Such a requirement may be necessary in certain soldering applications, for example, in order to protect heat-sensitive components and/or circuitry positioned closely adjacent the solder connection sites. When such registration is important, the patterned mask 89 may be formed with two or more upstanding pilot or positioning pins 91 located so as to allow registry with preformed, pin-receiving apertures 92 formed through the circuit board 88.

If desired, apertured spacers 94 of suitable heat resistant material may be coaxially mounted on the pins 91, and dimensioned so as to provide any desired degree of clearance between the adjacent surfaces of a particular circuit board and mask in order to carry out a desired heat-induced operation on the former. It should also be appreciated that a pilot pin-aligned mask and circuit board may be temporarily clamped together, such as by means of several spaced C-clamps (not shown) for mounting on the top of a vessel of the type depicted in FIG. 1, as well as when mounted within the pair of side rail grooves 87a, 87b of the side rails illustrated in FIG. 9.

With respect to the methods of the present invention, it has been shown that regardless which of the preferred embodiments are employed to perform a heating operation on a selected underside surface of an article, the following basic and significant operational steps are involved: First, a heat transfer liquid is boiled substantially at atmospheric pressure to form an initially coextensive body of condensible vapor, with the latter confined within restrictive boundaries, the peripheral (sidewall) and lower (base) boundaries being stationary. Secondly, an article is positioned at a first elevated boundary relative to the initially coextensive vapor body such that only the selected underside surface of the article is exposed to, and heated by, the vapor, while the article at the same time, at least in part, facilitates the confinement of the initially co-extensive vapor body within the stationary boundaries, and below the the first elevated boundary defined, at least in part, by the underside article surface, so as to minimize any loss of rising vapor to the atmosphere. Thirdly, each positioned article is isolated from at least the major portion of the initially co-extensive vapor body, the isolating step ocurring at a second elevated boundary located closely adjacent, but below, the first elevated boundary after the completion of a vapor condensation-induced heating operation of a properly positioned article, so as to then minimize any otherwise possible loss of vapor from at least the major portion of the vapor body to the atmosphere, prior to the removal of the heated article from its first boundary-defining position. Fourthly, any minor portion of the initially co-extensive vapor body that may become entrapped between the second isolating boundary and the underside of a positioned article (first boundary), is cooled and condensed prior to the removal of the article from its first boundary-defining position, with the condensate directed, such as by by gravity flow, back to the lowermost region of the then confined major portion of the vapor body for re-boiling.

Also in accordance with certain of the methods described and claimed herein, the confined vapor body is not only controllably exposed to the underside of an article positioned thereabove, but the vapor body advantageously is directed to and heats only a predetermined discrete area (or areas) on the underside of an article.

While several related and preferred vapor condensation embodiments have been disclosed herein, it is understood that various other related embodiments, and modifications thereof, could be devised by one skilled in the art without departing from the spirit and scope of the invention.

What is claimed is:

1. An apparatus for generating a body of hot condensible vapor of a heat transfer liquid for heating an article surface selectively exposed thereto by the transfer of the latent heat of vaporization of the vapor to the article, comprising:
    a vessel with stationary and integral sidewalls and base for, in part, confining a supply of heat transfer liquid therewithin, and being adapted to support an article on the top thereof;
    means for boiling a vessel-confined supply of heat transfer liquid to generate a body of condensible hot vapor therefrom;
    means secured to at least one vessel sidewall for venting the vessel to the atmosphere; and
    enclosing means including retractable cover plate means, the latter being dimensioned and mounted on said vessel at an elevation such that while in a first extended position, said cover plate means substantially completely closes the top of said vessel, so as to prevent any appreciable loss of a generated body of vapor therein to the atmosphere, and to also isolate the selected surface of an article from such vapor when vessel-supported above said cover plate means, whereas the latter while in a second retracted position exposes said selected article surface to a generated body of vapor, with said surface then cooperating with said vessel to also prevent any appreciable loss of vapor from the latter to the atmosphere, said cover plate means also including internal cooling means for condensing any hot vapor that may become entrapped between the upper surface of said cover plate means, while in said first position, and the adjacent selected surface of each successively heated article, before the removal of the latter from the vessel, and with said cover plate means and vessel being selectively further adapted to cause any resulting condensate on the former to be removed therefrom, and to be returned to the base region of said vessel.

2. An apparatus in accordance with claim 1 wherein said vessel sidewalls define a four-sided interior, and wherein said cover plate means comprises a planar cover plate having a cooling coil interposed between the major surfaces thereof.

3. An apparatus in accordance with claim 2 wherein said vessel is formed with a cover plate-receiving slot in one sidewall near the upper end thereof, and wherein the removal of any condensate formed on said cover plate is effected, at least in part, by said vessel including means associated with the two vessel sidewalls separated by said slotted sidewall for supporting and guiding said cover plate at a predetermined inclined angle relative to a horizontal reference plane, and by the lower forward edge of said cover plate and the mutually disposed inner surface of the adjacent vessel sidewall being selectively configured to define a plurality of spaced grooves that allow any condensate formed on the upper surface, in particular, of said cover plate, while in said first vessel-closing position, to flow by gravity therethrough back to the base region of said vessel.

4. An apparatus in accordance with claim 3 wherein the removal of any condensate formed on said cover plate is further effected by said vessel also including scraper means positioned in contact with the opposite major surfaces of said cover plate, and secured to the inner surface of the slotted vessel sidewall.

5. An apparatus in accordance with claim 3 further including a substantially planar mask formed with a predetermined apertured pattern so as to allow only an area corresponding thereto on the selected vessel-supported article surface to be exposed to a hot saturated body of vapor when generated within said vessel, said mask being interposed between said cover plate and the article to be heated, and also supported on said vessel.

6. An apparatus in accordance with claim 2 wherein said vessel is constructed with a completely open top, wherein the upper edges of said vessel sidewalls are adapted to directly support said article to be heated, and wherein said venting means effects separate venting of the respective areas associated with said vessel as defined below and above said cover plate when the latter is in its first vessel-closing position.

7. An apparatus in accordance with claim 2 wherein said vessel is formed with a partial integral top wall having a central opening therethrough of predetermined cross-section, wherein said apparatus further comprises at least a pair of guide rails respectively disposed on opposite sides of said central opening, said guide rails extending in parallel relationship, and being secured to adjacent surfaces of said partial top wall of said vessel, each of said guide rails having at least two closely spaced and longitudinally extending recessed areas formed in an inner, vertically oriented sidewall thereof, with the corresponding recessed areas in said guide rails being aligned and spaced apart such that the lower corresponding pair of recessed areas are adapted to support mutually disposed and respectively associated edge portions of said retractable cover plate, whereas the upper corresponding pair of recessed areas are adapted to support mutually disposed and respectively associated edge portions of an article to be heated, and wherein said apparatus further includes a stop member extending between and abutting one pair of common terminating ends of said guide rails.

8. An apparatus in accordance with claim 7 wherein the flow of any condensate formed on said cover plate is effected, at least in part, by having said lower pair of longitudinally extending recessed areas formed in said guide rails oriented at a predetermined inclined angle relative to a horizontal reference plane, said grooves thus supporting said cover plate at said inclined angle when the latter is in its first extended position not only to effectively close said vessel, through the central opening therein, from the atmosphere, but to cause the run-off of any condensate formed thereon.

9. An apparatus in accordance with claim 7 wherein a third longitudinally extending recessed area is formed in each of said guide rails, and is interposed between said upper and lower recessed areas, and wherein said apparatus further comprises a substantially planar mask, formed with a predetermined apertured pattern, and supported along mutually disposed edge regions thereof in said aligned third pair of guide rail recessed areas, so as to allow only an area on the selected surface of a vessel-mounted article that corresponds to said predetermined apertured pattern to be exposed to a hot saturated body of vapor when generated within said vessel.

10. An apparatus in accordance with claim 7 wherein the removal of any condensate formed on the cooled major surfaces of said cover plate is effected by said vessel including scraper means positioned in contact with the opposite major surfaces of said cover plate at least near the end of said guide rails opposite said stop member, and secured to said guide rails.

11. An apparatus in accordance with claim 8 wherein the removal of any condensate formed on said cover plate is further effected by said vessel also including scraper means positioned in contact with the opposite major surfaces of said cover plate at least near the end of said guide rails opposite said stop member, and secured to said guide rails.

12. An apparatus for generating a body of hot condensible vapor of a heat transfer liquid for heating a selected underside article surface selectively exposed thereto by the transfer of the latent heat of vaporization of the vapor to the article, comprising:

a vessel with four stationary sidewalls and a base for, in part, confining a supply of heat transfer liquid therewithin, and being adapted to support an article on the top thereof, one of said vessel sidewalls being formed with a horizontal slot near the upper edge thereof, and each of the two sidewalls on opposite sides of the slotted sidewall having guide and support means extending downwardly at a slight predetermined angle, relative to a horizontal reference plane, from the slotted sidewall to the sidewall opposite the former;

means for boiling a vessel-confined supply of heat transfer liquid to generate a body of condensible hot saturated vapor therefrom;

means secured to at least one of said vessel sidewalls for venting the vessel, and for also preventing the loss of any generated vapor therethrough to the atmosphere, and enclosing means including retractable cover plate means, the latter being dimensioned to extend through said vessel sidewall slot, and to be supported along opposite edge portions thereof by respectively associated ones of said vessel sidewall guide and support means at an elevation such that while in a first extended position, said cover plate means substantially completely closes the top of said vessel, so as to prevent any appreciable loss of a generated body of vapor therein to the atmosphere, and to also isolate the selected underside surface of an article from such vapor when vessel-supported above said cover plate means, whereas the latter while in a second retracted position exposes said selected underside article surface to a generated body of vapor, with said selected surface then cooperating with said vessel to also close the otherwise open top thereof, said cover plate means further including internal cooling means for condensing any hot vapor that may become entrapped between the upper surface thereof, while in said first position, and the adjacent selected underside surface of each successively heated article, before the removal of the latter from the vessel, said angle of inclination of said cover plate means allowing any resulting condensate formed thereon to flow by gravity back to the base region of said vessel.

13. An apparatus in accordance with claim 12 wherein the lower forward edge of said cover plate means and the inner surface of the mutually disposed vessel sidewall are selectively configured to define a plurality of spaced grooves that allow any condensate formed on the upper surface of said cover plate means, while in said first vessel-closing position, to flow by gravity therethrough back to the base region of said vessel, and wherein said means for venting the vessel effects separate venting of the respective areas associated therewith as defined below and above said cover plate means when the latter is in its first vessel-closing position.

14. An apparatus for generating a body of hot condensible vapor of a heat transfer liquid for heating an article surface selectively exposed thereto by the transfer of latent heat of vaporization of the vapor to the article, comprising:

a vessel with four stationary and integral sidewalls, base and a partial top wall, the latter defining a central opening of predetermined dimensions, for confining a supply of heat transfer liquid therewithin, said vessel further comprising at least a pair of guide rails respectively disposed and extending in parallel relationship on opposite sides of said central opening, said guide rails being secured to adjacent surfaces of said partial top wall of said vessel, with each of said guide rails having at least two closely spaced and longitudinally extending support grooves formed in an inner vertically oriented sidewall thereof, the lower aligned pair of grooves formed in said guide rails being oriented at a predetermined inclined angle relative to a horizontal reference plane, said vessel further including a stop member extending between and abutting one pair of common terminating ends of said guide rails;

means for boiling a vessel-confined supply of heat transfer liquid to generate a hot body of condensible vapor therefrom;

means secured to at least one of said vessel sidewalls for venting the vessel, and for also preventing the loss of any generated vapor therethrough to the atmosphere, and enclosing means including retractable cover plate means, the latter being dimensioned such that opposite edge portions thereof are received within and supported by different ones of said lower pair of aligned and inclined guide rail grooves, and said cover plate means being positioned at an elevation such that while in a first inwardly extended and inclined position, the latter at least substantially completely closes said vessel, through the central opening therein, from the atmosphere, and to also isolate the exposed surface of an article from such vapor when vessel-supported above said cover plate means, whereas the latter while in a second retracted position exposes said selected article surface to a generated body of vapor, with said article surface then cooperating with said vessel to also prevent any appreciable loss of vapor to the atmosphere, said cover plate means also including internal cooling means for condensing any hot vapor that may become entrapped between the upper surface thereof, while in said first position, and the adjacent surface of each successively heated article, before the removal of the latter from the vessel guide rails, said angle of inclination of said cover plate means allowing any resulting condensate formed thereon to flow at least in part by gravity back to the base region of said vessel.

15. An apparatus in accordance with claim 14 further comprising a third longitudinally extending groove formed in each of said guide rails, said third groove being interposed between and extending in close parallel relationship with the upper one of said first two mentioned closely spaced grooves formed in each guide rail, and wherein said apparatus further comprises a substantially planar mask formed with a predetermined apertured pattern, said mask being supported along mutually disposed edge regions thereof in different ones of said third pair of intermediate grooves, so as to allow only an area on the surface of a guide rail-mounted article that corresponds to said predetermined apertured pattern to be exposed to a hot saturated body of vapor when generated within said vessel.

16. An apparatus in accordance with claim 15 wherein said stop member has three longitudinally extending support grooves formed in an inner, vertically oriented sidewall thereof, said stop member grooves being respectively aligned with the grooves formed in said guide rails, and wherein said means for venting the vessel effects separate venting of the respective areas associated therewith as defined below and above said cover plate means when the latter is in its vessel-closing position.

17. An apparatus for generating a body of hot condensible vapor of a heat transfer liquid for heating an article surface selectively exposed thereto by the transfer of latent heat of vaporization of the vapor to the article, comprising:

a vessel with four stationary and integral sidewalls, base and a partial top wall, the latter defining a central opening of predetermined dimensions, for confining a supply of heat transfer liquid therewithin, said vessel further comprising at least a pair of guide rails respectively disposed and extending in parallel relationship on opposite sides of said central opening, said guide rails being secured to adjacent surfaces of said parallel top wall of said vessel, with each of said guide rails having at least two closely spaced and longitudinally extending support grooves formed in an inner vertically oriented sidewall thereof, said vessel further including a stop member extending between and abutting one pair of common terminating ends of said guide rails;

means for boiling a vessel-confined supply of heat transfer liquid to generate a hot body of condensible vapor therefrom;

means secured to at least one of said vessel sidewalls for venting the vessel, and for also preventing the loss of any generated vapor therethrough to the atmosphere, and enclosing means including retractable cover plate means, the latter being dimensioned such that opposite edge portions thereof are received within and supported by different ones of said lower pair of aligned grooves, and said cover plate means being positioned at an elevation such that while in a first inwardly extended position, the latter at least substantially completely closes said vessel, through the central opening therein, from the atmosphere, and to also isolate the exposed surface of an article from such vapor when vessel-supported above said cover plate means, whereas the latter while in a second retracted position exposes said selected article surface to a generated body of vapor, with said article surface then cooperating with said vessel to also prevent any appreciable loss of vapor to the atmosphere, said cover plate means also including internal cooling means for condensing any hot vapor that may become entrapped between the upper surface thereof, while in said said first position, and the adjacent surface of each successively heated article, before the removal of the latter from the vessel guide rails, and said cover plate means and vessel further selectively including means for removing any resulting condensate from said cover plate means, so as to allow said condensate to flow at least in part by gravity back to the base region of said vessel.

18. An apparatus in accordance with claim 17 wherein said means for removing any resulting condensate formed on said cover plate means is effected at least in part by said vessel also including scraper means positioned in contact with opposite major surfaces of said cover plate means at least near the end of said guide rails opposite said stop member, and secured to said guide rails, and wherein said means for venting the vessel effects separate venting of the respective areas associated therewith as defined below and above said cover plate means when the latter is in its first vessel-closing position.

19. An apparatus in accordance with claim 17 further comprising a third longitudinally extending groove formed in each of said guide rails, said third groove being interposed between and extending in close parallel relationship with the upper one of said first two mentioned closely spaced grooves formed in each guide rail, and wherein said apparatus further comprises a substantially planar mask formed with a predetermined apertured pattern, said mask being supported along mutually disposed edge regions thereof in different ones of said third pair of intermediate grooves so as to allow only an area on the selected underside surface of a guide rail-mounted article that corresponds to said predetermined apertured pattern to be exposed to a hot saturated body of vapor when generated within said vessel.

20. A method of performing a heating operation at an elevated temperature on only a selected underside surface of an article, comprising the steps of:
  boiling a heat transfer liquid substantially at atmospheric pressure to form an initially co-extensive body of hot condensible vapor of the heat transfer liquid at the elevated temperature, while being permanently confined with respect to base and side boundaries;
  positioning an article to at least in part define a first elevated boundary such that only the selected underside surface of the article is exposed to, and heated by, the vapor, while the article at the same time, at least in part, facilitates the confinement of the initially co-extensive vapor body below said first elevated boundary, and within said base and side boundaries, so as to minimize any loss of rising vapor to the atmosphere.
  isolating each positioned article from at least the major portion of the initially co-extensive vapor body, said isolating step occurring at a second vapor-confining elevated boundary located closely adjacent, but below, said first elevated boundary, and after the completion of a vapor-condensation-induced heating operation on the article, but prior to the removal of the heated article from its first elevated boundary-defining position, and
  cooling while confining at least substantially all of any minor portion of the initially co-extensive vapor body that may become entrapped between the first and second elevated vapor-confining boundaries, prior to the removal of the heated article from its first boundary-defining position, with any resulting vapor-entrapped condensate being directed back to the lower most region of the then confined major portion thereof for re-boiling and re-use as part of another single, co-extensive vapor body.

21. A method in accordance with claim 20 wherein only predetermined discrete areas of the selected underside article surface are exposed to, and heated by, said co-extensive vapor body prior to the isolating step.

22. A method of performing a vapor condensation heat-induced operation on a selected underside surface of a substantially planar configured article, comprising the steps of:
  boiling a heat transfer liquid substantially at atmospheric pressure within a vessel having at least a substantially open top so as to establish an initially co-extensive, hot, saturated vapor body that tends to rise therewithin;
  positioning an article to at least in part define a first elevated boundary adjacent the top of the vessel such that only the selected underside surface of the article is exposed to, and heated by, the vapor while the article, at least in part, contributes to the confinement of the initially co-extensive vapor body below said first elevated boundary, and within the vessel so as to prevent any appreciable loss of vapor to the atmosphere;
  isolating each positioned article from at least the major portion of said initially co-extensive vapor body, said isolating step occurring at a second vapor-confining elevated boundary which is located below said first elevated boundary, and after the completion of a vapor condensation-induced heating operation on the article, but prior to the removal of the heated article from its first elevated boundary-defining position, and
  cooling while confining at least substantially all of any vapor that may become entrapped between the first and second vapor-confining elevated boundaries, prior to the removal of the heated article from its first boundary-defining position, with any resulting vapor-entrapped condensate being directed at least in part by gravity flow back to the remaining heat transfer liquid at the base region of said vessel.

23. A method in accordance with claim 22 wherein only a selected discrete patterned area on the selected underside surface of the positioned article is exposed to, and heated by, said co-extensive vapor body when generated within the vessel, prior to the isolating step.

24. A method in accordance with claim 22 wherein that portion of the selected underside surface of a positioned article exposed to, and heated by, said coextensive vapor body functions directly and exclusively as an upper vapor-confining vessel wall.

* * * * *